United States Patent
Souma et al.

(10) Patent No.: US 6,345,109 B1
(45) Date of Patent: Feb. 5, 2002

(54) FACE RECOGNITION-MATCHING SYSTEM EFFECTIVE TO IMAGES OBTAINED IN DIFFERENT IMAGING CONDITIONS

(75) Inventors: Masaki Souma; Kenji Nagao, both of Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/984,061

(22) Filed: Dec. 3, 1997

(30) Foreign Application Priority Data

| Dec. 5, 1996 | (JP) | ............................................. 8-339114 |
| Dec. 11, 1996 | (JP) | ............................................. 8-346457 |
| Mar. 14, 1997 | (JP) | ............................................. 9-079170 |

(51) Int. Cl.[7] ................................................. G06K 9/00

(52) U.S. Cl. ....................................................... 382/118

(58) Field of Search ................................. 382/118, 130, 382/205, 224, 228, 209, 248, 210, 203, 206, 165, 190, 225, 217, 218, 221; 364/725; 348/526

(56) References Cited

U.S. PATENT DOCUMENTS

| 5,164,992 A | | 11/1992 | Turk et al. | |
| 5,208,870 A | * | 5/1993 | Ennis | ........................... 382/209 |
| 5,710,833 A | * | 1/1998 | Moghaddam et al. | ........ 382/118 |
| 5,872,865 A | * | 2/1999 | Normile et al. | .............. 382/224 |

FOREIGN PATENT DOCUMENTS

JP  4-101280  4/1992

OTHER PUBLICATIONS

"Face Recognition Using Eigenfaces" by M. A. Turk et al; 1991 IEEE; pp., 586–591.

"Automatic Face Recognition: What Representation?" by N. Colson et al; The Institute of Electronics, Information and Communication Engineers, HIP95–32; Jan. 1996; pp., 37–42.

"A Handwritten Character Recognition System Using Modified Mahalanobis Distance" by N. Kato et al; The Transaction of IEICE, vol. J79–D–II, No. 1, Jan. 1996; pp., 45–52.

* cited by examiner

*Primary Examiner*—Jose L. Couso
*Assistant Examiner*—Shawn B. Cage
(74) *Attorney, Agent, or Firm*—Lowe Hauptman Gopstein Gilman & Berner

(57) ABSTRACT

A system capable of pattern matching between a less noisy face image and a noisier face image obtained in different imaging conditions. A weighted sum of a covariance matrix calculated from less noisy sample images obtained for a plurality of sample faces and a covariance matrix calculated from differences between the less noisy sample images and corresponding noisier sample images obtained for the sample faces is first obtained. A principal component analysis is applied to the weighted sum to find and store in memory a result with which principal components are calculated from a given face image. In actual pattern matching, a first face image and a second face image are first obtained. The degree of similarity between the first and second face images is calculated based on a conventional formula by using the result of the principal component analysis. The matching between the first and second face images is achieved based on a comparison of the degree of similarity with a predetermined threshold value.

20 Claims, 7 Drawing Sheets

FIG. 4

FROM STEP 330 OF FIG. 3

COMPENSATE EACH EIGENVALUE $\lambda j$ WITH A PREDETERMINED FIXED VALUE $\sigma$ AS FOLLOWS:
$\lambda j \Leftarrow \lambda j + \sigma$  — 340

EIGENVECTORS AND EIGENVALUES OF THE COVARIANCE MATRIX $Cs$,
$\{(ej, \lambda j + \sigma) \mid j = 1, 2, 3, \ldots, M\}$  — 174a

TO STEP 360 OF FIG. 3

FIG. 6

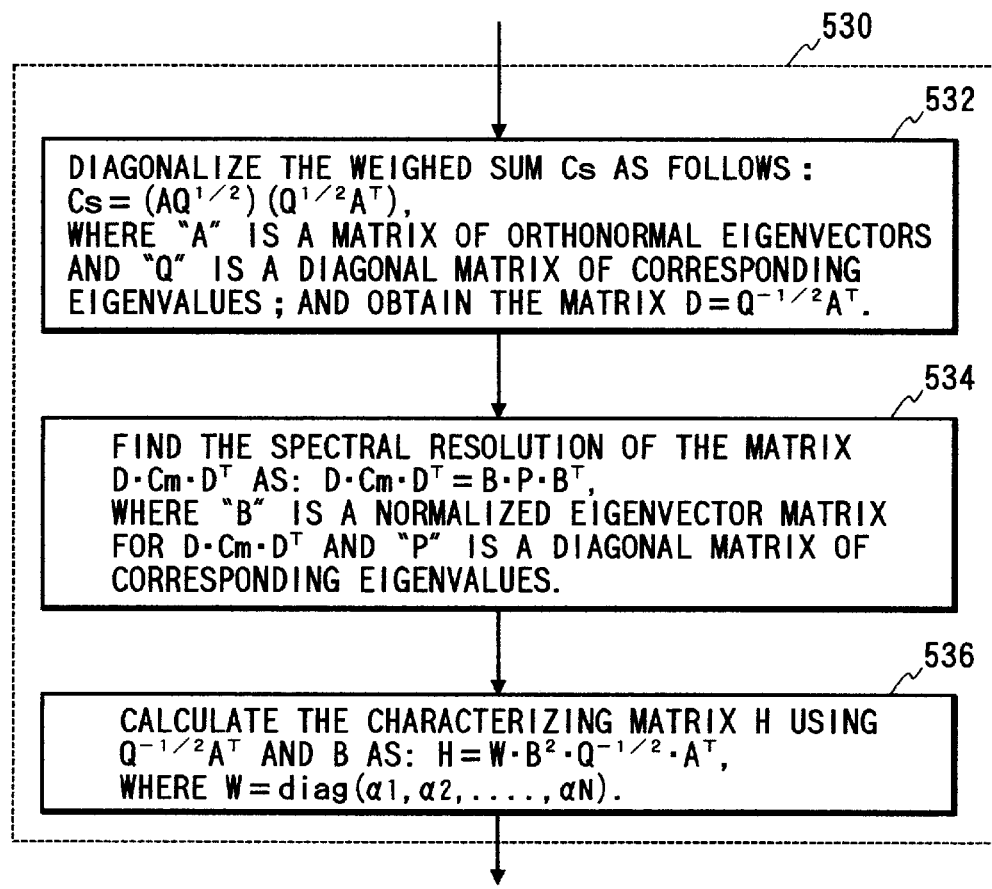

532 — DIAGONALIZE THE WEIGHED SUM Cs AS FOLLOWS:
$Cs = (AQ^{1/2})(Q^{1/2}A^T)$,
WHERE "A" IS A MATRIX OF ORTHONORMAL EIGENVECTORS AND "Q" IS A DIAGONAL MATRIX OF CORRESPONDING EIGENVALUES; AND OBTAIN THE MATRIX $D = Q^{-1/2}A^T$.

534 — FIND THE SPECTRAL RESOLUTION OF THE MATRIX $D \cdot Cm \cdot D^T$ AS: $D \cdot Cm \cdot D^T = B \cdot P \cdot B^T$, WHERE "B" IS A NORMALIZED EIGENVECTOR MATRIX FOR $D \cdot Cm \cdot D^T$ AND "P" IS A DIAGONAL MATRIX OF CORRESPONDING EIGENVALUES.

536 — CALCULATE THE CHARACTERIZING MATRIX H USING $Q^{-1/2}A^T$ AND B AS: $H = W \cdot B^2 \cdot Q^{-1/2} \cdot A^T$, WHERE $W = \text{diag}(\alpha_1, \alpha_2, \ldots, \alpha_N)$.

FIG. 7

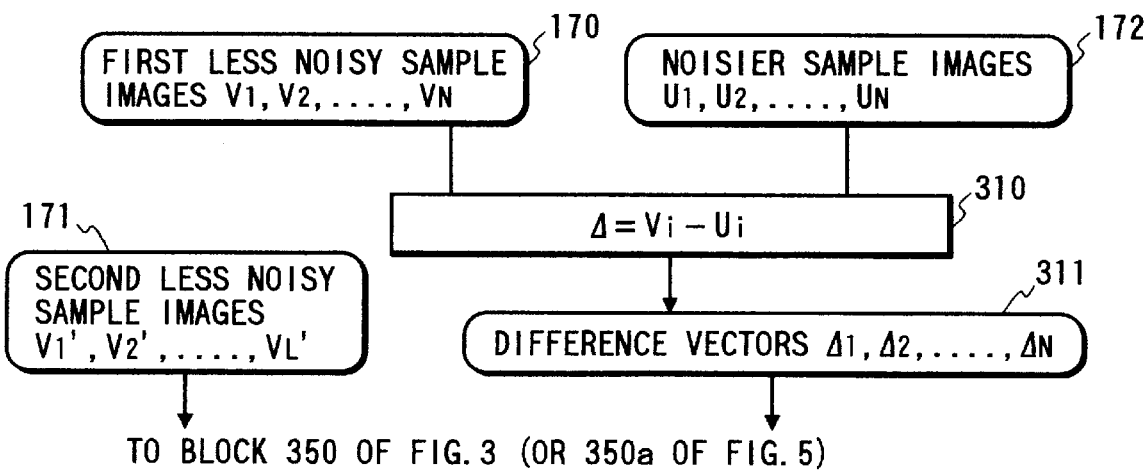

- 170: FIRST LESS NOISY SAMPLE IMAGES $V_1, V_2, \ldots, V_N$
- 172: NOISIER SAMPLE IMAGES $U_1, U_2, \ldots, U_N$
- 310: $\Delta = V_i - U_i$
- 171: SECOND LESS NOISY SAMPLE IMAGES $V_1', V_2', \ldots, V_L'$
- 311: DIFFERENCE VECTORS $\Delta_1, \Delta_2, \ldots, \Delta_N$ TO BLOCK 350 OF FIG. 3 (OR 350a OF FIG. 5)

TO STEP 330 OF FIG. 3 (OR TO STEP 530 OF FIG. 5)

TO STEP 330 OF FIG. 3 (OR TO STEP 530 OF FIG. 5)

FACE RECOGNITION-MATCHING SYSTEM EFFECTIVE TO IMAGES OBTAINED IN DIFFERENT IMAGING CONDITIONS

BACKGROUND OF THE INVENTION

1. Field of the Invention

The present invention generally relates to a pattern recognition system and, more specifically, to a system which permits a reliable identification of a subject image of an object, e.g., a human face even when noise or variation components have been added to either of the subject image and the reference images.

2. Description of the Prior Art

Various pattern recognition schemes have been proposed based on the principal component analysis (or Karhunen-Loeve expansion). One such scheme is disclosed in U.S. Pat. No. 5,164,992, "Face Recognition System" issued to M. A. Turk et al. on Nov. 17, 1992. According to this scheme, a training set of $N^2$-dimensional image vectors is reduced by a principal component analysis into a set of M orthonoral eigenvectors $u_k$ (k=1, 2, . . . M) and their associated eigenvalues $\lambda_k$, which best describes the distribution of the images. Then, the vectors of a subject image and reference images (a super set of the training images) are projected onto the $u_k$-vector space. The subject is identified based on a distance between the projected subject and each of the projected reference images, which is calculated according to one of well-known distance definitions, e.g., the Euclidean distance.

N. Costen, I. Craw and S. Akamastu, in "Automatic Face Recognition: What Representation?" *Technical Report of IEICE* (*The Institute of Electronics, Information and Communication Engineers*) *of Japan*, HIP95-32 (January 1996), have reported that the recognition accuracy is raised by using the Maharanobis distance.

A modified Maharanobis distance in which a bias value is added to each eigenvalue is reported by N. Kato, M. Abe and Y. Nemoto in "A Handwritten Character Recognition System Using Modified Maharanobis distance", the *Transaction of IEICE*, Vol. J79-D-II, No. 1, January 1996, at pages 45–52.

It has been proved that the above mentioned recognition schemes provide satisfactory recognition accuracy as long as noise or variation components of either the subject or the reference images are negligibly small. However, in the actual situation, if for example the illumination condition differs vary much at the time of acquiring a subject image and that of a corresponding reference image, this causes the subject and the corresponding reference image to differ significantly from each other, resulting in a failure in the identification of subject in the conventional systems. This is because the effect of the noise components which are included in the reference set of images are not taken into account in any of the conventional systems.

SUMMARY OF THE INVENTION

It is therefore an object of the invention to provide a pattern recognition system and method for permitting a robust pattern recognition of a subject even if large noise components exist in either the subject or reference images.

According to the present invention, a (off line) preprocessing is performed prior to an actual pattern recognition operation so as to enable pattern matching between a first face image having been obtained in a first imaging condition and a second face image having been obtained in a second imaging condition inferior to the first imaging condition. For a plurality of sample faces, respective first sample images are obtained in a first sample imaging condition similar to or the same as the first imaging condition. For the same sample faces, respective second sample images are obtained in a second sample imaging condition similar to or the same as the second imaging condition. A first covariance matrix calculated from the first sample images and a second covariance matrix calculated from differences between the first sample images and the second sample images are weighted and summed into a weighted sum. Then, a principal component analysis is applied to the weighted sum to find and store in memory a result with which principal components are calculated from a given face image.

The result comprises, for example, eigenvectors and corresponding eigenvalues resulted from solving an eigenvalue problem with respect to the weighted sum. Alternatively, the result may comprise a characterizing matrix which, when applied to a given face image vector, yields a principal component vector for the given face image vector.

In actual pattern matching, the first face image and the second face image are obtained through a communication interface, a video camera, and/or an image scanner. The degree of similarity between the first and second face images is calculated on the basis of a standard or well-known formula by using the result of the principal component analysis. It is determined whether the first face image matches the second image, on the basis of a comparison of the degree of similarity with a predetermined threshold value.

According to an embodiment of the invention, there is provided a system which enables pattern matching between a first face image obtained in a first imaging condition and a second face image obtained in a second imaging condition which is noisier than the first imaging condition. The system comprises: means for obtaining, for a plurality (N) of first sample faces, respective first sample images in a sample imaging condition similar to or the same as the first imaging condition; means for obtaining, for the N sample faces, respective second sample images in a second sample imaging condition similar to or the same as the second imaging condition; means for obtaining, for a plurality (L) of second sample faces, respective third sample images in the sample imaging condition; means for obtaining a weighted sum of a covariance matrix calculated from differences between the first sample images and the second sample images and a covariance matrix calculated from the third sample images; means for applying a principal component analysis to the weighted sum to find a result with which principal components are calculated from a given face image; and means for enabling the result to be used for a later pattern matching process executed within the system or by an external system.

In order to enable the system to carry out pattern patching, the system may further comprise: means for obtaining the first face image (e.g., a video or digital camera); means for obtaining the second face image (e.g., a scanner); means operative on the basis of a standard formula for calculating a degree of similarity between the first and second face images by using the data means; and means operative on the basis of a comparison of the degree of similarity with a predetermined threshold value for determining whether the first face image matches the second image.

Alternatively, a system capable of pattern matching between a first face image obtained in a first imaging condition and a second face image obtained in a second imaging condition which is noisier than the first imaging condition may comprise data means stored in a storage for use in extracting principal components from a given face image. The data means is obtained by: taking in, for a plurality of sample faces, respective first sample images in a first sample imaging condition similar to or the same as the first imaging condition; taking in, for the plurality of the sample faces, respective second sample images in a second sample imaging condition similar to or the same as the second imaging condition; calculating a weighted sum of a first covariance matrix calculated from the first sample images and a second covariance matrix calculated from differences between the first sample images and the second sample images; and applying a principal component analysis to the weighted sum to find a result with which principal components are calculated from a given face image. The system further comprises: means for obtaining the first face image; means for obtaining the second face image; means operative on the basis of a standard formula for calculating a degree of similarity between the first and second face images by using the data means; and means operative on the basis of a comparison of the degree of similarity with a predetermined threshold value for determining whether the first face image matches the second image.

Either the first face images or the second face images may be collected and stored in a mass storage as a reference face image set (e.g., a database) in advance. In this case, for each face image of the reference face image set, a degree of similarity for a given face image is calculated.

BRIEF DESCRIPTION OF THE DRAWING

Further objects and advantages of the present invention will be apparent from the following description of the preferred embodiments of the invention as illustrated in the accompanying drawing. In the drawing.

FIG. 4 is a partial flow diagram to be inserted between the steps 330 and 360 of FIG. 3 if each eigenvalue is to be compensated with a predetermined fixed value σ which is determined based on the imaging conditions about the image scanner 30 channel and the video 40 channel;

FIG. 6 is a flow chart showing, in a detailed form, the process of the step 530 of FIG. 5;

FIG. 7, when connected to block 350 of FIG. 3 (or block 350a of FIG. 5), forms a flow chart showing the operation of an embodiment of the invention so modified that different less noisy sample image sets are used for the calculations of Cm and Cp;

Throughout the drawing, the same elements when shown in more than one figure are designated by the same reference numerals.

DETAILED DESCRIPTION OF THE PREFERRED EMBODIMENTS

Figure 1:
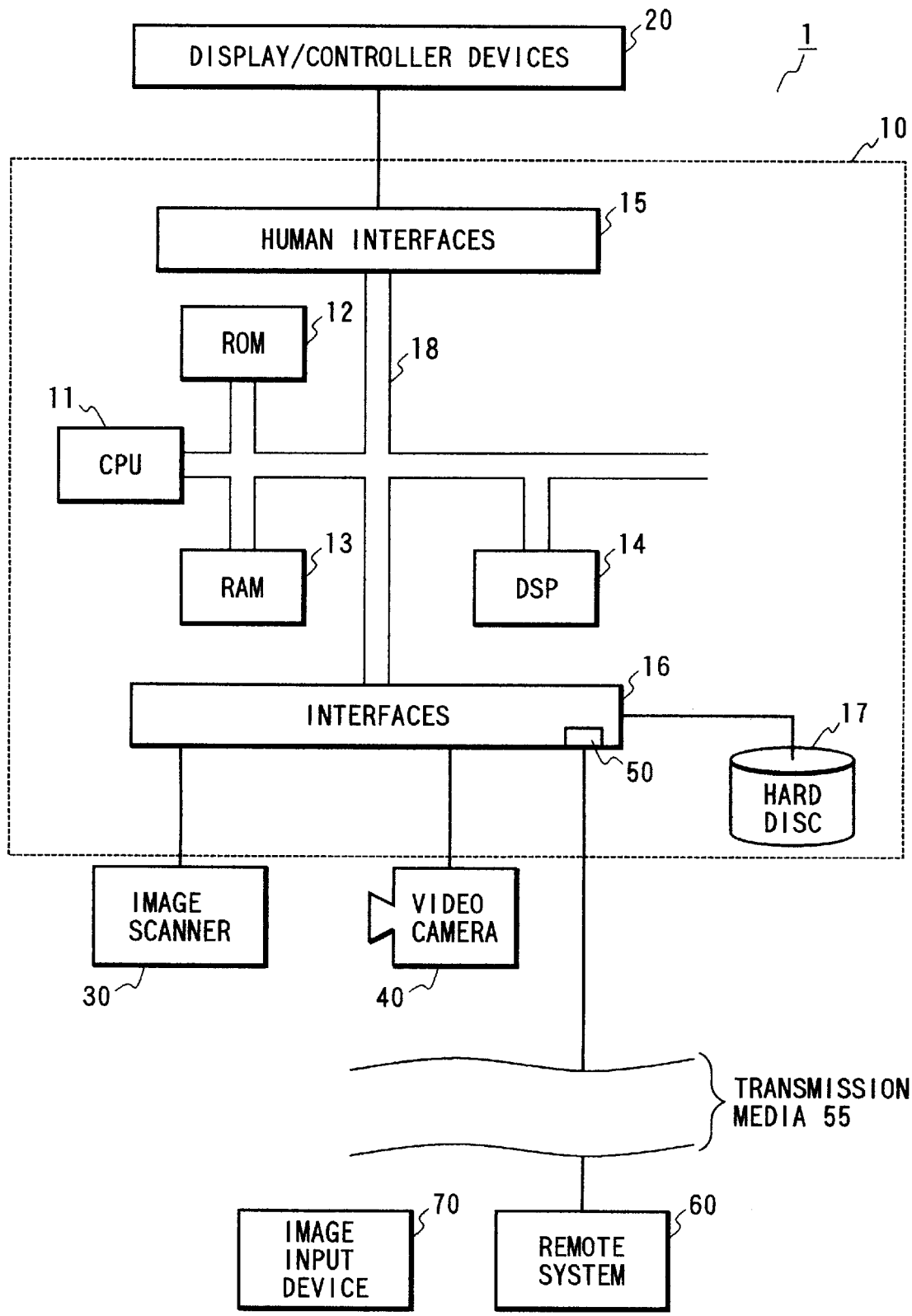
FIG. 1 is a schematic diagram showing an exemplary arrangement of a face recognition/matching system embodying the present invention.

FIG. 1 is a schematic diagram showing an exemplary arrangement of a face recognition/matching system embodying the present invention. In FIG. 1, the face recognition/matching system 1 comprises a main body 10 which is basically a computer comprising hardware and/or programs for recognizing a given image as one of the reference images stored therein and for deciding the degree of similarity of two given images; display/controller devices 20 for permitting the user to interactively operate the system 1; an image scanner 30 for scanning, e.g., a face picture to take in the image of the face picture as a reference image; and a video camera 40 for taking a picture of a face. The main body 10 comprises a CPU (central processing unit) 11 which operates under the control of the programs; ROM (read only memory) 12; RAM (random access memory) 13; a DSP (digital signal processor) 14 responsive to the CPU 11 for executing a part of the process in place of the CPU 11, a bus 18 interconnecting the elements 11 through 14, human interfaces 15 for connecting the bus 18 with interfaces of each of the display/controller devices 20; interfaces 16 for connecting the bus 18 with the image scanner 30 and the video camera 40; and a hard disc 17, connected with the bus 18 via the interface 16, for storing reference image data and intermediate data used for the calculation of the degree of similarity. The interfaces 16 may include a communication port (or interface) 50 for connecting the bus 18 with a transmission media 55 such as a telecommunication network so as to communicate with a remote system 60 provided with an image input device 70.

For the sake of better understanding of the present invention, it will be useful to specifically describe the operation of a conventional face matching system for deciding whether two given face images match each other. (Deciding whether two given (face) images match each other is, hereinafter, referred to as "pattern (face) matching". On the other hand, finding, for a given (face) image, one, if any, out of the stored reference (face) images which matches the given face image is, hereinafter, referred to as "pattern (or face) recognition". However, it is noted that a pattern recognition comprises a pattern matching of the given face image to each of the stored reference images.)

Figure 2:
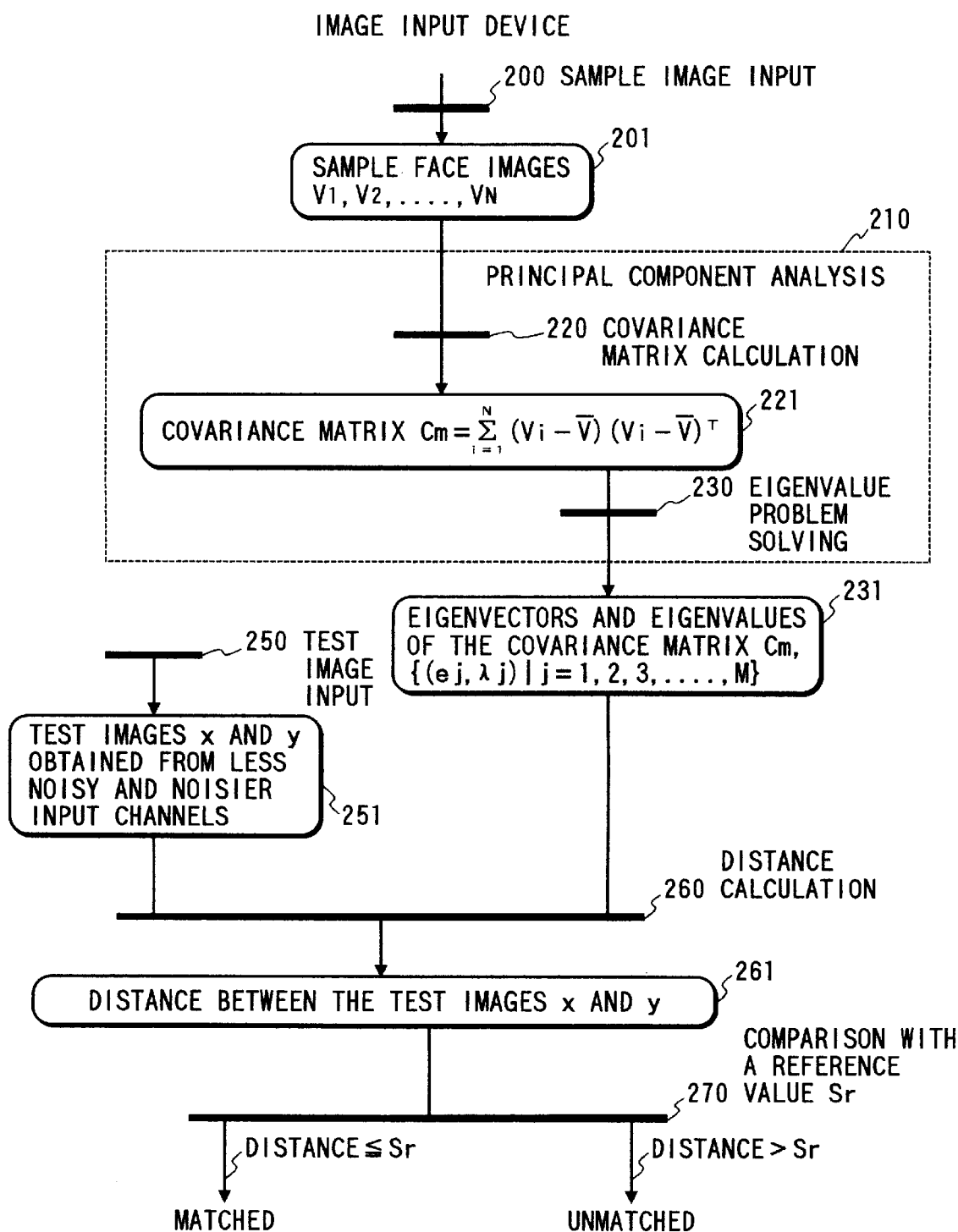
FIG. 2 is a flow diagram illustrating a procedure followed in the operation of a conventional face matching system which calculates the degree of similarity of given face images by using eigenvectors and eigenvalues obtained through a conventional principal component analysis.

FIG. 2 is a flow diagram illustrating a procedure followed in the operation of a conventional face matching system which calculates the degree of similarity of given face images by using eigenvectors and eigenvalues obtained through a conventional principal component analysis. In FIG. 2, horizontal bold lines indicate the steps which constitute the procedure and blocks with round corners contain data used in the procedure. In step 200, sample face images $V_1, V_2, \ldots, V_N$ are taken in from a relatively less noisy image input channel, e.g., a video camera. Let each face image be a two-dimensional m×n array of intensity values. Then each face image is expressed as an m×n dimensional vector $V_i$. In step 210, the sample face images $V_1, V_2, \ldots, V_N$ are subjected to a principal component analysis to find eigenvectors $e_1, e_2, \ldots, e_M$ and corresponding eigenvalues $\lambda_1, \lambda_2, \ldots, \lambda_M$ (M<<m×n) by calculating the covariance matrix $$Cm = \sum_{i=1}^{N}(V_i - \overline{V})(V_i - \overline{V})^T$$

of the sample face images in step 220 and solving the eigenvalue problem with respect to the matrix Cm in step 230 (i.e., an orthonormal base is calculated from the N sample face images and M base axes ($e_1, e_2, \ldots, e_M$) with the M largest eigenvalues ($\lambda_1, \lambda_2, \ldots, \lambda_M$) are selected from the base in step 210). The obtained eigenvectors and eigenvalues 231 are stored in memory (a hard disc). If two test images x and y are given in step 250, then in step 260 a distance between the test images x and y is calculated based on an appropriate distance definition such as the Euclidean distance, the Maharanobis distance or the like by using the eigenvectors and eigenvalues (i.e., the test images x and y are orthogonally projected into a space spanned by the base axes $e_j$ (1<j<M) and then the distance between the projected test images is calculated). Finally, the calculated distance is compared with a predetermined reference value Sr to determine that the test images x and y are matched up to each other if the distance is equal to or smaller than the value Sr and to determine that the test images x and y are unmatched if the distance is larger than the value Sr. In such manners as just described, pattern matching has been performed so far.
Embodiment 1

Figure 3:
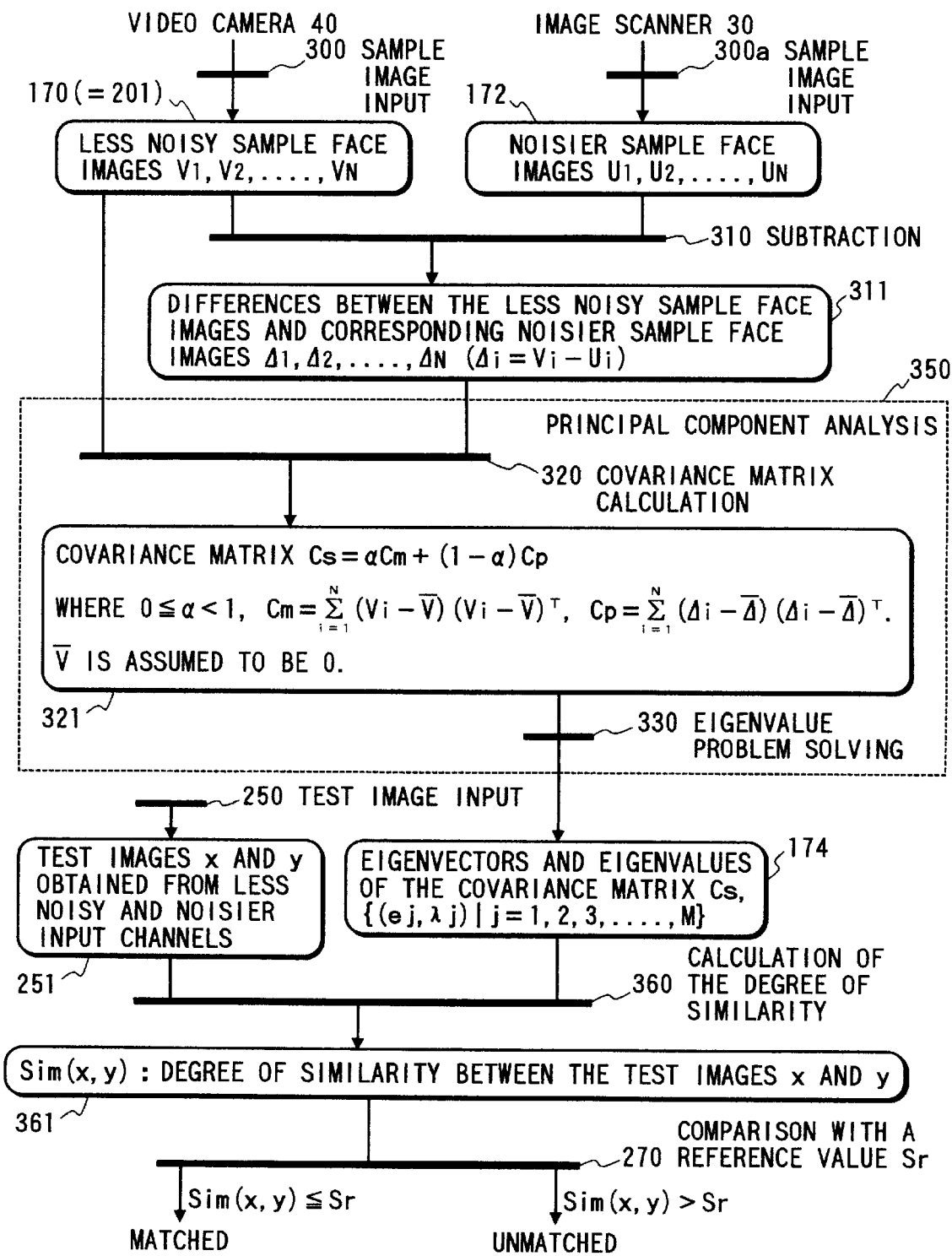
FIG. 3 is a diagram illustrating the flow of a procedure followed and data processed in the operation of a first illustrative embodiment of the invention in which the degree of similarity of given face images is calculated by using eigenvectors and eigenvalues obtained through a principal component analysis.

FIG. 3 is a diagram illustrating the flow of a procedure followed and data processed in the operation of a first illustrative embodiment of the invention in which the degree of similarity of given face images is calculated by using eigenvectors and eigenvalues obtained through a principal component analysis. In FIG. 3, horizontal bold lines indicate the steps which constitute the procedure and blocks with round corners contain data used in the procedure as in FIG. 2. Steps 300, 300a, 310 and 350 which comprises steps 320 and 330 are executed off line prior to actual pattern matching or recognition. The other steps 250, 360 and 270 are executed on line for pattern matching.

In step 300, images for N sample faces are taken from a less noisy image input system, e.g., a video camera 40 and stored as less noisy sample face images $\{V_i|i=1, 2, \ldots, N\}$ 170 in the hard disc 17 of FIG. 1. In step 300a, noisier sample face images for the same sample faces are taken in, for example, from an image scanner 30 scanning a printed image, such as a photograph of each of the sample faces and stored as $\{U_i|i=1, 2, \ldots, N\}$ 172 in the hard disc 17. In this case, each of the less noisy sample face images 170 and the noisier sample face images 172 comprises a two-dimensional m×n array of intensity values and is expressed as an m×n dimensional vector $V_i$ or $U_i$, respectively. The dimension of the vectors $V_i$ and $U_i$ is on the order of, e.g., 100,000. In step 310, the CPU 11 calculates and stores a difference pattern (or matrix) between each vector $V_i$ and a corresponding vector $U_i$, $\Delta_i = V_i - U_i$. Each element $\Delta_i$ of the difference sample set $\{\Delta_i|i=1, 2, \ldots, N\}$ 311 represents noise components found in a face image $U_i$ but not in $V_i$. The number N of sample faces may be for example on the order of a thousand.

In step 350, as in step 210 of FIG. 2 the CPU 11 applies a principal component analysis to an integrated sample set (weighted sum set) of the sample face (image) set $\{V_i|i=1, 2, \ldots N\}$ 170 and the difference sample set $\{\Delta_i|i=1, 2, \ldots, N\}$ 311 to yield eigenvectors and eigenvalues for a weighted sum of the covariance matrix of the sample image set 170 and the covariance matrix of the difference vector set 311.

Specifically, in step 320, the CPU 11 calculates the covariance matrix Cm of the sample face image vectors $\{V_i|i=1, 2, \ldots, N\}$ 170 as $$Cm = \sum_{i=1}^{N}(V_i - \overline{V})(V_i - \overline{V})^T, \qquad (1)$$

the covariance matrix Cp of the difference vectors $\{\Delta_i|i=1, 2, \ldots, N\}$ 311 as $$Cp = \sum_{i=1}^{N}(\Delta_i - \overline{\Delta})(\Delta_i - \overline{\Delta})^T, \text{ and} \qquad (2)$$

a weighted sum Cs of the covariance matrices Cm and Cp as $$Cs = \alpha Cm + (1-\alpha)Cp, \qquad (3)$$

where $\overline{V}$ and $\overline{\Delta}$ are averages of $V_1, V_2, \ldots, V_N$ and $\Delta_1, \Delta_2, \ldots, \Delta_N$ expressed as, e.g., $$\overline{V} = \frac{1}{N} \cdot \sum_{i=1}^{N} V_i,$$

the superscript "T" indicates that the matrix accompanied thereby is a transported matrix, and a is a weight coefficient in such a range that $0 \leq \alpha < 1$. An appropriate value of the weight coefficient $\alpha$ is determined in response to the characteristics of the image scanner 30 and the video camera 40 through trial and error in experimental pattern recognition or matching. In this case, it is preferable to set the initial value of $\alpha$ to 0.5 and then change the value of $\alpha$ little by little so as to yield higher recognition accuracy. It is also noted that $\overline{\Delta} = 0$ is assumed. Thus, the step 320 supplies the next step with $$Cs = \alpha \sum_{i=1}^{N}(V_i - \overline{V})(V_i - \overline{V})^T + (1-\alpha)\sum_{i=1}^{N}\Delta_i \Delta_i^T. \qquad (4)$$

In step 330, the CPU 11 solves the eigenvalue problem with respect to the covariance matrix Cs to obtain and store eigenvectors $e_1, e_2, \ldots, e_M$ and eigenvalues $\lambda_1, \lambda_2, \ldots, \lambda_M$, or $\{(e_j, \lambda_j)|1 \leq j \leq M\}$ 174, in the hard disc 17. The number M of the eigenvectors and the eigenvalues is, e.g., on the order of a hundred (<<m×n). In this case, all of the solutions of the eigenvalue problem are not necessarily required to be used. Usually, pairs of M largest eigenvalue and their corresponding eigenvectors, $(e_j, \lambda_j)$, are selected. However, it may sometimes be the case that excluding a pair $(e_j, \lambda_j)$ whose eigenvalue $\lambda_j$ is extremely large yields higher matching accuracy. Accordingly, it is preferable to determine the selection criterion taking such situations into account.

Since the eigenvectors and eigenvalues $\{(e_j, \lambda_j)|1 \leq j \leq M\}$ 174 are prepared taking into account the effect of noise or variation components (due to the difference in optical conditions between the two image input systems including the video camera 40 and the image scanner 30), the face recognition/matching system 1 is robust to even large noises or variations of an image to be tested.

In a face matching process, in step 250 the CPU 11 first takes in less noisy image x and noisier image to be tested through the video camera 40, the image scanner 30 and/or the transmission media 50. As just mentioned, test image(s) x and/or y may be taken in through the transmission media 50 from one, of the remote systems provided with image input devices 70, say 60, which each is of similar or preferably the same optical characteristics to or as that of the element 30 or 40. Then, in step 360, the CPU 11 calculates the quantity indicative of the degree of similarity by using one of various well-known definitions on distance and correlation. In this specific embodiment, the Maharanobis distance is calculated as the degree of similarity, Sim(x, y) 361, as follows:

$$\text{Sim}(x, y) = \sqrt{\sum_{j=1}^{M} \frac{((x-\overline{V}, e_j) - (y-\overline{V}, e_j))^2}{\lambda^j}}, \quad (5)$$

where (,) indicates an inner product, and M is the number of principal components used in the embodiment. Finally, in step 270, the CPU 11 compares the value of Sim(x, y) 361 with a predetermined reference (or threshold) value Sr, and judges the test images x and y to be matched to each other if Sim(x, y)≦Sr and unmatched otherwise, which completes the process.

Since the Euclidean distance is defined as $$\sqrt{\sum_{j=1}^{M} ((x-\overline{V}, e_j) - (y-\overline{V}, e_j))^2}, \quad (6)$$

measuring the distance between x and y by means of the Maharanobis distance means whitening the sample set (i.e., applying a conversion $$\psi \cdot \text{diag}\left(\frac{1}{\sqrt{\lambda_1}}, \cdots, \frac{1}{\sqrt{\lambda_M}}\right) \cdot \psi^T$$

$\left(\begin{array}{l}\text{where } \psi \text{ is a column vector comprising } e_j (1 \leq j \leq M) \text{ and diag( ) is} \\ \text{a diagonal matrix with its arguments as diagonal elements.}\end{array}\right)$ for normalizing the variance to the test images x and y) and then calculating the Euclidean distance between the converted x and y. Whitening the integrated sample set which is a sum-set of the sample face set and the difference sample set has the same effect as in case when the sample face set and the difference sample set are whitened separately. Whitening the difference sample set causes variations in the directions of base axes with larger noise components to be reduced, which contributes to a reduction in the effect of noise of a test face image in face matching. For this, the Maharanobis distance yields higher recognition/matching accuracy than the Euclidean distance. However, it should be noted that the present invention, even when used with the Euclidean distance, can provide improved recognition/matching accuracy.

Modifications

In step 360, the degree of similarity, Sim(x, y), may be found by calculating the correlation instead of calculating the Maharanobis distance. In this case, $$\text{Sim}(x, y) = \frac{\sum_{j=1}^{M} (x-\overline{V}, e_j)(y-\overline{V}, e_j)/\lambda_j}{\sqrt{\sum_{j=1}^{M} (x-\overline{V}, e_j)^2/\lambda_j} \sqrt{\sum_{j=1}^{M} (y-\overline{V}, e_j)^2/\lambda_j}} \quad (7)$$

FIG. 4 is a partial flow diagram to be inserted between the steps 330 and 360 of FIG. 3 if each eigenvalue is to be compensated with a predetermined fixed value σ which is determined based on the imaging conditions about the image scanner 30 channel and the video 40 channel. After step 320, the CPU 11 proceeds to step 340 to read each of the eigenvalues $\lambda_1, \lambda_2, \ldots, \lambda_M$ stored in the hard disc 17, add the predetermined fixed value σ to the read eigenvalue $\lambda_j$, and return the result to the location from which the eigenvalue $\lambda_j$ has been read. This causes eigenvectors and eigenvalues of the covariance matrix Cs, $\{(ej, \lambda j+\sigma)|1 \leq j \leq M\}$ to be passed to the step 360 of FIG. 3. In this case, the fixed value σ is set to about 1/1000 of the largest eigenvalue $\lambda_1$. Since the smallest eigenvalue $\lambda_M$ is usually about 1/100 of the fixed value, compensated eigenvalues for smaller eigenvalues are approximately equal to σ. This compensation prevents axes associated with smaller eigenvalues from having too large effects on the face recognition/matching, providing higher recognition/matching accuracy.

Alternatively, each eigenvalue $\lambda_j$ may be compensated with a value τ defined as follows.

$$\tau = \frac{1}{M} \sum_{j=1}^{M} \lambda_j((1-\mu_j)/\mu_j), \quad (8)$$

where $$\mu_j = ((B-A)(j-1))/(M-1)+A,$$

where A and B are fixed values specific to the system and satisfy A<B. In this case, values $\{(ej, \lambda j+\tau)|1 \leq j \leq M\}$ are passed as the eigenvalues to the step 360 of FIG. 3. This compensation causes the effect of component $e_j$ on the face recognition/matching to vary, with the value of j, substantially in proportion to the corresponding eivenvalue $\lambda_j$. Selecting appropriate values for A and B enables further precise face recognition/matching.

It should be noted that the above described compensation of the eigenvalues with σ or τ is effective in both expressions (5) and (7).

Embodiment II

Figure 5:
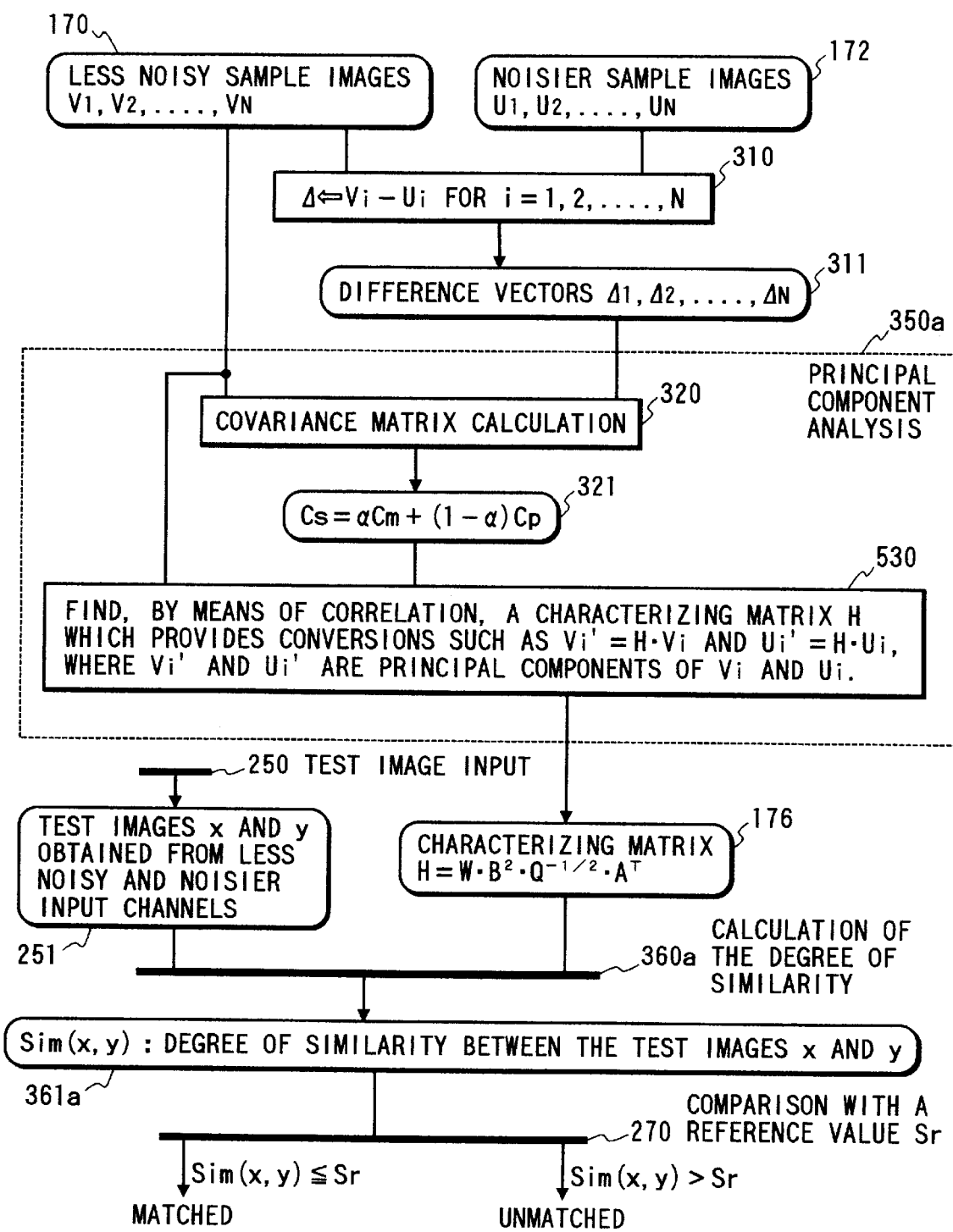
FIG. 5 is a flow diagram of a procedure followed and data processed in the operation of a second illustrative embodiment of the invention in which the degree of similarity of given face images is calculated by using a characterizing matrix obtained through a principal component analysis by correlation.

FIG. 5 is a diagram illustrating the flow of a procedure followed and data used in the operation of a second illustrative embodiment of the invention in which the degree of similarity of given face images is calculated by using a characterizing matrix obtained through a principal component analysis by correlation. The second embodiment of FIG. 5 is identical to the first embodiment shown in FIG. 3 except that the elements 330 (350), 174, 360 and 361 have been replaced with the elements 530 (350a), 176, 360a and 361a in FIG. 5. For this, only the different elements will be described in the following. In this embodiment, the principal component analysis is achieved not by solving an eigenvalue problem with respective to the integrated covariance matrix Cs 321 but by finding a characterizing matrix H 176 which provides conversions such as $V_i'=HV_i$ and $U_i'=HU_i$ as shown in step 530, where $V_i'$ and $U_i'$ are principal components of image vectors $V_i$ and $U_i$, respectively. Then, in step 360a, the degree of similarity for given test images x and y, Sim(x, y), is obtained by calculating, for example, the Euclidean distance $\|V_i'-U_i'\|$ or the cosine $(V_i' \cdot U_i')/(|V_i'|\cdot|U_i'|)$, i.e., $$\text{Sim}(x, y)=\|Hx-Hy\| \text{ or} \tag{9}$$

$$\text{Sim}(x, y)=((Hx)\cdot(Hy))/(|Hx|\cdot|Hy|), \tag{10}$$

where $|X|$ is the magnitude of the vector X and $(X\cdot Y)$ is an inner product of the vectors X and Y.

In other words, a characterizing space (matrix H) suitable for pattern recognition/matching is selected by using covariance matrices Cm and Cs in step 530, and characteristics (principal components) is extracted from the given test images x and y, i.e., the test images x and y (of m×n dimensions) is projected into a space of reduced (e.g., M) dimensions (M<<m×n) in the calculation of the degree of similarity between x and y in step 360a. Selecting a characterizing space means selecting M orthogonal coordinate axes (or vectors) defining such M-dimensional space, and extracting characteristics means applying a linear transform (matrix) comprising such M vectors to the test images x and y. For this, the sample image space and the difference vector space are orthogonalized through a transform which diagonalizes both of the covariance matrices Cm and Cs as detailed in the following.

FIG. 6 is a flow chart showing, in a detailed form, the process of the step 530 of FIG. 5. In step 532, the CPU 11 diagonalizes the weighted sum Cs as follows:

$$Cs=(AQ^{1/2})(Q^{1/2}A^T), \tag{11}$$

and provides the matrix $D=Q^{-1/2}A^T$, where "A" is a matrix composed of orthonornal eigenvectors for Cs and "Q" is a diagonal matrix composed of corresponding eigenvalues; and $Q^{1/2}$ is a square root matrix of Q. In step 534, the CPU 11 converts the covariance matrix Cm into a matrix $DCmD^T$ and finds a spectral resolution for the matrix $DCmD^T$ as follows.

$$DCmD^T=BPB^T, \tag{12}$$

where "B" is a normalized eigenvector matrix of $DCmD_T$ and "P" is a diagonal matrix composed of corresponding eigenvalues. Then in step 536, the CPU 11 calculates the characterizing matrix $$H=WB^TQ^{-1/2}A^T, \tag{13}$$

where $W=\text{diag}(\alpha_1, \alpha_2, \ldots, \alpha_N)$ ($\alpha_i \geq 0$). The diagonal elements $\alpha_1, \alpha_2, \ldots, \alpha_N$ of the diagonal matrix W are coefficients for weighting the principal components. These weight coefficients are experimentally determined so as to yield higher recognition accuracy.

The effectiveness of the characterizing matrix H will be discussed in the following. Let $$L=B^TQ^{-1/2}A^T. \tag{14}$$

Applying the transform H is equivalent to applying the transform L and then a transform for multiplying the weight coefficients. Assume that the transform matrix L is applied to the sample images $V_i$ and $U_i$, i.e., $$V_i'=LV_i \text{ and } U_i'=LU_i. \tag{15}$$

This conversion results in conversions of the matrices Cs (given by the equation (4)) and Cm as follows.

$$\begin{aligned} Cs \xrightarrow{L} Cs' &= \alpha Cm' + (1-\alpha)Cp' \\ &= \alpha \sum_1^N (LV_i)(LV_i)^T + (1-\alpha)\sum_1^N (L(V_i-U_i))(L(V_i-U_i))^T \\ &= \alpha \sum_1^N LVV^TL^T + (1-\alpha)\sum_1^N L(V_i-U_i)(V_i-U_i)^TL^T \\ &= \alpha LCmL^T + (1-\alpha)LCpL^T \\ &= L(\alpha Cm + (1-\alpha)Cp)L^T \\ &= LCsL^T \\ &= B^TQ^{-1/2}A^TAQA^TAQ^{-1/2}B \\ &= E \quad (E: \text{a unit matrix}) \end{aligned} \tag{16}$$

$$\begin{aligned} Cm \xrightarrow{L} Cm' &= \sum_1^N (LV_i)(LV_i)^T \\ &= \sum_1^N (B^TDM)(M^TD^TB) \\ &= B^TDCmD^TB \\ &= B^TBPB^TB \\ &= P \end{aligned} \tag{17}$$

As seen from equation (3), the covariance matrix Cp is also diagonalized as follows.

$$\begin{aligned} E &= LCsL^T \\ &= \alpha LCmL^T + (1-\alpha)LCpL^T \\ &= \alpha P + (1-\alpha)Cp' \\ Cp' &= (E - \alpha P)/(1-\alpha) \end{aligned} \tag{18}$$

As is apparent from equations (17) and (18), the sample vector covariance matrix Cm' and the difference vector covariance matrix obtained by the transforms of equation (15) have eigenvectors in common. Further from equation (18), Assuming that the eigenvalues of Cm' are $x_1, x_2, x_3, \ldots, x_N$ in order of their magnitude (i.e., $x_1 > x_2 > x_3 > \ldots > x_N \geq 0$), then the eigenvalues of Cp', $y_1, y_2, y_3, \ldots, y_N$, are $$y_1 = (1 - \alpha x_1)/(1-\alpha),$$
$$y_2 = (1 - \alpha x_2)/(1-\alpha),$$
$$\vdots$$
$$y_N = (1 - \alpha x_N)/(1-\alpha)$$

Thus, $y_1 < y_2 < y_3 < \ldots < y_N$, which is opposite, in order of the magnitude, to the case of the eigenvalues of Cm'.

As is well-known in the art, each of the eigenvalues of a covariance indicates (the square of) the variance in the direction of the corresponding eigenvector. The conversions of equation (15) cause the sample vector space and the difference vector space to share the axes of distribution (the eigenvalues) and have opposite orders with respect to the magnitudes of variances in the axial direction. That is, it can be said that the sample vector space and the difference vector space is diagonalized by the conversion of equation (15). It is noted that applying the conversion H is to emphasize the diagonalization by enlarging the variance in each axial direction after the conversion by L.

According to the present invention, the principal component analysis is achieved taking account of the difference in the imaging conditions between the image scanner 30 and the video camera 40, which enables precise face pattern recognition/matching even when the difference is vary large.

Modifications

It is noted that the weight coefficient a may be set to 0 in the equation (3). Since Cs=αCm+(1−α)Cp=Cp in this case, setting α to 0 causes the calculation of the covariance matrix Cm to be eliminated. Also, it is also noted that multiplying the right side of the equation (3) by a constant does not affect the validity of the equation (3). For this reason, if the coefficient α is set to 0.5, then Cs can be expressed as Cs=Cm+Cp.

In the above described illustrative embodiments, the principal component analysis 350 (350*a*) has been applied to a combination of both a less noisy sample image vector set 170 and a set 311 of difference vectors between the less noisy sample image vector set 170 and a noisier sample image vector set 172. However, the principal component analysis 350 (350*a*) may be applied to a combination of a set 311 of difference vectors between a first less noisy sample image vector set 170 and a noisier sample image vector set 172 and a second less noisy sample image vector set $\{V_i'|1 \leq i \leq L\}$ 171 as shown in FIG. 7. As will be appreciated from the foregoing, each difference vector of the difference vector set 311 indicates noise components and each second less noisy sample image vector of the set 170 may indicate face features. By doing this, it is possible to independently prepare the second less noisy sample image vector set 171 and the difference vector set 311 between the first less noisy sample image vector set 170 and the noisier sample image vector set 172, which enables a higher-precision matching. It is noted that the second less noisy sample images may be taken from L sample faces different from the N sample faces that have been used for the first less noisy sample images and the noisier sample images. The numbers N and L may be either the same or not.

Figure 8:
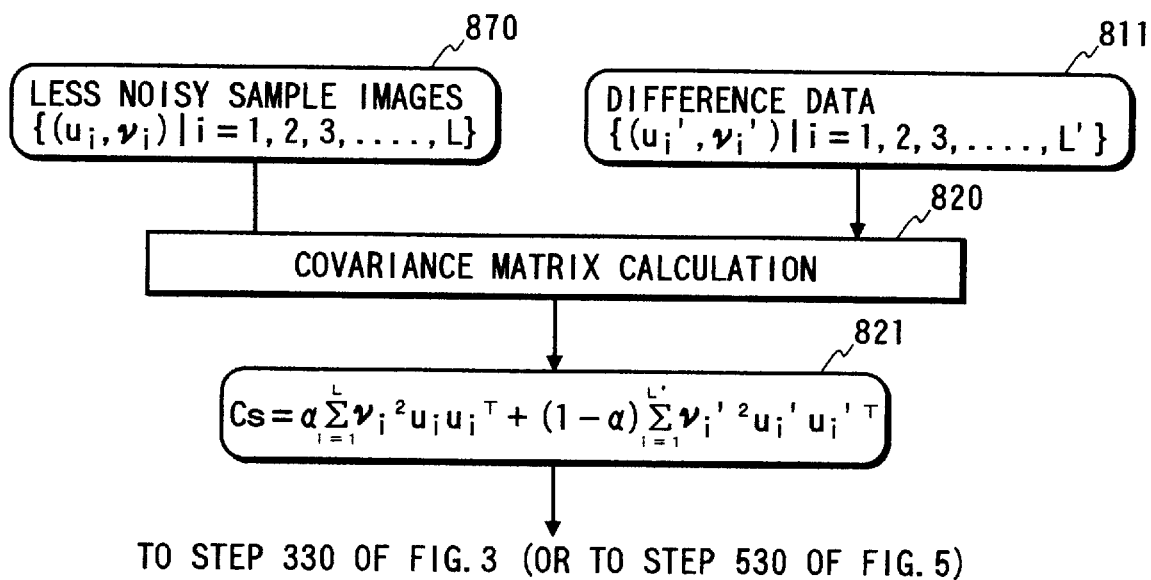
FIG. 8, when connected to step 330 of FIG. 3 (or step 530 of FIG. 5), forms a flow chart showing the operation of an embodiment of the invention so modified that each less noisy sample image and a difference between each less noisy sample image and a corresponding noisier sample image are applied as a combination of a base axis vector and a variance in the direction of the base axis vector to the principal component analysis block 350 of FIG. 3 (or block 350a of FIG. 5)

In the above described embodiments, the principal component analysis block 350 (350*a*) has been supplied with data 170 indicative of less noisy sample images and data 311 indicative of the differences between the less noisy sample images and noisier sample images in the form of vectors. However, the data 170 and 311 have not necessarily to be vectors. Each piece of the data 170 and/or the data 311 may be expressed with a base axis and a variance in the direction of the base axis. If, for example, the less noisy sample images and the differences between the less noisy sample images and noisier sample images are given as $\{(u_i, v_i)|1 \leq i \leq L\}$ 870 and $\{(u_i', v_i')|1 \leq i \leq L'\}$ 811, respectively, as shown in FIG. 8, then the equation (4) becomes $$Cs = \alpha \sum_{i=1}^{L} v_i^2 u_i u_i^T + (1-\alpha) \sum_{i=1}^{L'} v_i'^2 u_i' u_i'^T.$$

Figure 9:
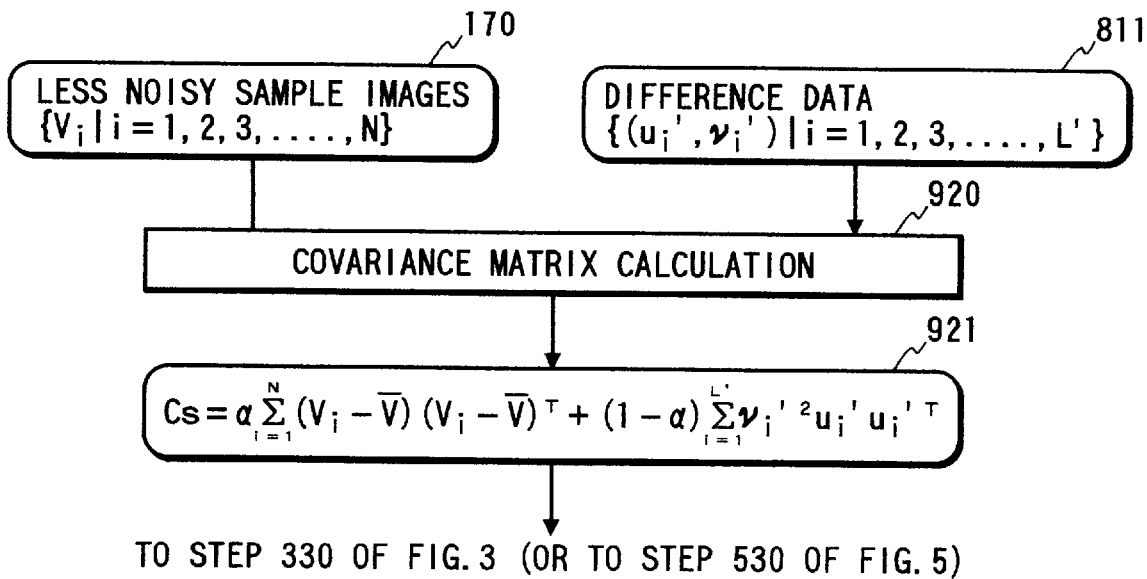
FIG. 9, when connected to step 330 of FIG. 3 (or step 530 of FIG. 5), forms a flow chart showing the operation of an embodiment of the invention so modified that a difference between each less noisy sample image and a corresponding noisier sample image is applied as a combination of a base axis vector and a variance in the direction of the base axis vector to the principal component analysis block 350 of FIG. 3 (or block 350a of FIG. 5).

If, for example, the less noisy sample images and the differences between the less noisy sample images and noisier sample images are given as $\{V_i|1 \leq i \leq N\}$ 170 and $\{(u_i', v_i')|1 \leq i \leq L'\}$ 811, respectively, as shown in FIG. 9, then the equation (4) becomes $$Cs = \alpha \sum_{i=1}^{N} (V_i - \overline{V})(V_i - \overline{V})^T + (1-\alpha) \sum_{i=1}^{L'} v_i'^2 u_i' u_i'^T.$$

It is also noted that the less noisy sample images and the differences between the less noisy sample images and noisier sample images may be different in number, i.e., L and L' may be different and N and L' may be different.

Though the above illustrative embodiments have been described in conjunction with pattern matching of given face images, the present invention is applicable to pattern recognition for finding one, if any, of the reference face images which best matches up to a given face image. If the embodiment of FIG. 5 is to be modified so as to be used for face pattern recognition, principal components of each of a reference set of face images (which is probably a super set of the less noisy sample face images $V_1, V_2, \ldots V_N$) have been preferably calculated and stored in the hard disc 17 prior to face pattern recognition operation. This facilitates the calculation of the degree of similarity.

Though the face recognition/matching system 1 of FIG. 1 is provided with the image scanner 30 and the video camera 40, a face recognition/matching system provided with a communication interface instead of imaging device can be considered. In this case, the system works as a face recognition/matching server which serves other systems having imaging devices.

In the above illustrative embodiments, the face matching process has been described as executed by the CPU 11. However, a part or the whole of the steps 320, 330 and 330 of FIG. 3 or the steps 320, 530 and 360*a* of FIG. 5 may be executed by the DSP 14 under the control of the CPU 11.

Many widely different embodiments of the present invention may be constructed without departing from the spirit and scope of the present invention. It should be understood that the present invention is not limited to the specific embodiments described in the specification, except as defined in the appended claims.

What is claimed is:

1. A system which enables pattern matching between a first face image obtained in a first imaging condition and a second face image obtained in a second imaging condition noisier than the first imaging condition, the system comprising:

first means for obtaining, for a plurality of sample faces, respective first sample images in a first sample imaging condition similar to or the same as said first imaging condition;

second means for obtaining, for said plurality of said sample faces, respective second sample images in a second sample imaging condition similar to or the same as said second imaging condition;

means for calculating a weighted sum of a first covariance matrix calculated from said first sample images and a second covariance matrix calculated from differences between said first sample images and said second sample images;

means for applying a principal component analysis to said weighted sum to find a result with which principal components are calculated from a given face image; and means for enabling said result to be used for a later pattern matching process executed within the system or by an external system, wherein said means for applying a principal component analysis to said weighted sum comprises means operative on the basis of the spectrum resolution of said weighted sum for finding a characterizing matrix which, when applied to a given face image vector, yields a principal component vector for said given face image vector.

2. The system as defined in claim 1, wherein letting said characterizing matrix be H, said characterizing matrix H is expressed as $$H = WB^T Q^{-1/2} A^T,$$

where:

$B^T$ and $A^T$ are transposed matrices of matrices B and A;

$Q^{-1/2} A^T$ are obtained from respective relations $Cs = (AQ^{1/2})(Q^{1/2}A^T)$, where Cs is said weighted sum, "A" is an eigenvector matrix comprising orthonormal eigenvectors for Cs, and $Q^{1/2}$ is a square root matrix of a diagonal matrix Q having, as diagonal elements thereof, eigenvalues associated with said orthonormal eigenvectors for Cs;

BT is found from a relation $DCmD^T = BPB^T$, where $D = Q^{-1/2}A^T$, Cm is said first covariance matrix calculated from said first sample images, "B" is an eigenvector matrix comprising orthonormal eigenvectors for $DCmD^T$, and "P" is a diagonal matrix having, as diagonal elements thereof, eigenvalues associated with said orthonormal eigenvectors for $DCmD^T$; and W is a diagonal matrix having weight coefficients as diagonal elements thereof.

3. A system which enables pattern matching between a first face image obtained in a first imaging condition and a second face image obtained in a second imaging condition noisier than the first imaging condition, the system comprising:

first means for obtaining, for a plurality of sample faces, respective first sample images in a first sample imaging condition similar to or the same as said first imaging condition;

second means for obtaining, for said plurality of said sample faces, respective second sample images in a second sample imaging condition similar to or the same as said second imaging condition;

means for calculating a weighted sum of a first covariance matrix calculated from said first sample images and a second covariance matrix calculated from differences between said first sample images and said second sample images;

means for applying a principal component analysis to said weighted sum to find a result with which principal components are calculated from a given face image; and means for enabling said result to be used for a later pattern matching process executed within the system or by an external system, wherein:

letting said weighted sum, said first covariance matrix calculated from said first sample images, and said second covariance matrix calculated from said differences be Cs, Cm and Cp, respectively, said means for calculating a weighted sum comprises means for obtaining Cs = a Cm + (1−α)Cp, where α is a weight coefficient and $0 \leq \alpha < 1$.

4. A system which enables pattern matching between a first face image obtained in a first imaging condition and a second face image obtained in a second imaging condition noisier than the first imaging condition, the system comprising:

first means for obtaining, for a plurality of sample faces, respective first sample images in a first sample imaging condition similar to or the same as said first imaging condition;

second means for obtaining, for said plurality of said sample faces, respective second sample images in a second sample imaging condition similar to or the same as said second imaging condition;

means for calculating a weighted sum of a first covariance matrix calculated from said first sample images and a second covariance matrix calculated from differences between said first sample images and said second sample images;

means for applying a principal component analysis to said weighted sum to find a result with which principal components are calculated from a given face image, and means for enabling said result to be used for a later pattern matching process executed within the system or by an external system, wherein assuming that said first sample images are $V_1, V_2, \ldots, V_N$ (N is the number of sample faces), said second sample images are $U_1, U_2, \ldots, U_N$, said differences are $\Delta_1, \Delta_2, \ldots, \Delta_N$, and said weighted sum is Cs, then said means for calculating a weighted sum comprises means for calculating $$Cs = \alpha \sum_{i=1}^{N} (V_i - \overline{V})(V_i - \overline{V})^T + (1-\alpha) \sum_{i=1}^{N} \Delta_i \Delta_i^T$$

where $$\overline{V} = \frac{1}{N} \sum_{i=1}^{N} V_i, \; \Delta_i = V_i - U_i$$

and α is a weight coefficient in a range $0 \leq \alpha < 1$.

5. The system as defined in claim 3, wherein said covariance matrix Cm is calculated from tuples $\{(u_i, v_i) | 1 \leq i \leq N\}$ of base axes $u_i$ and variances $v_i$ in the directions of respective base axes which indicate the distribution of said first face images and said covariance matrix Cp is calculated from tuples $\{(u_i', v_i') | 1 \leq i \leq N\}$ of base axes $u_i'$ and variances $v_i'$ in the directions of respective base axes which indicate the distribution of said differences, resulting in $$Cs = \alpha \sum_{i=1}^{N} v_i^2 u_i u_i^T + (1-\alpha) \sum_{i=1}^{N} v_i'^2 u_i' u_i'^T.$$

6. The system as defined in claim 3, wherein said covariance matrix Cm is calculated from said first sample images $(V_1, V_2, \ldots, V_N$ (N is the number of sample faces)) and said covariance matrix Cp is calculated from tuples $\{(u_i', v_i') | 1 \leq i \leq N\}$ of base axes $u_i'$ and variances $v_i'$ in the directions of respective base axes which indicate the distribution of said differences, resulting in $$Cs = \alpha \sum_{i=1}^{N} (V_i - \overline{V})(V_i - \overline{V})^T + (1-\alpha) \sum_{i=1}^{N} v_i'^2 u_i' u_i'^T.$$

7. A system which enables pattern matching between a first face image having been obtained in a first imaging condition and a second face image having been obtained in a second imaging condition noisier than the first imaging condition, the system comprising:

first means for obtaining, for a plurality (N) of first sample faces, respective first sample images in a first sample imaging condition similar to or the same as said first imaging condition;

second means for obtaining, for said N sample faces, respective second sample images in a second sample imaging condition similar to or the same as said second imaging condition, said first means obtaining, for a plurality (L) of second sample faces, respective third sample images in said sample imaging condition;

means for calculating a weighted sum of a covariance matrix calculated from difference between said first sample images and said second sample images and a covariance matrix calculated from said third sample images;

means for applying a principal component analysis to said weighted sum to find a result with which principal components are calculated from a given face image; and means for enabling said result to be used for a later pattern matching process executed within the system or by an external system, wherein assuming that said first sample images are $V_1, V_2, \ldots, V_N$ (N is the number of sample faces), said second sample images are $U_1, U_2, \ldots, U_N$, said differences are $\Delta_1, \Delta_2, \ldots, \Delta_N$, said third sample images are $V_1', V_2' V_L'$ (L is the number of second sample faces) and said weighted sum is Cs, then said means for calculating a weighted sum comprises means for calculating $$Cs = \alpha \sum_{i=1}^{L} (V_i' - \overline{V'})(V_i' - \overline{V'})^T + (1-\alpha)\sum_{i=1}^{N} \Delta_i \Delta_i^T$$

where $$\overline{V'} = \frac{1}{L}\sum_{i=1}^{L} V_i', \Delta_i = V_i - U_i$$

and $\alpha$ is a weight coefficient in a range $0 \leq \alpha < 1$.

8. A system capable of pattern matching between a first face image having been obtained in a first imaging condition and a second face image having been obtained in a second imaging condition noisier than the first imaging condition, the system comprising:

data means stored in a storage for use in extracting principal components from a given face image, said data means having been obtained by:

for a plurality of sample faces, taking in respective first sample images in a first sample imaging condition similar to or the same as said first imaging condition;

taking in, for said plurality of said sample faces, respective second sample images in a second sample imaging condition similar to or the same as said second imaging condition;

calculating a weighted sum of a first covariance matrix calculated from said first sample images and a second covariance matrix calculated from differences between said first sample images and said second sample images; and applying a principal component analysis to said weighted sum to find a result with which principal components are calculated from a given face image;

first means for obtaining said first face image;

second means for obtaining said second face image;

means operative on the basis of a standard formula for calculating a degree of similarity between said first and second face images by using said data means; and means operative on the basis of a comparison of said degree of similarity with a predetermined threshold value for determining whether said first face image matches said second image, wherein said data means comprises eigenvectors and corresponding eigenvalues resulted from solving an eigenvalue problem with respect to said weighted sum, wherein said first and second images (of m×n pixels) are given as vectors x and y, said first face images are given as $V_1, V_2, \ldots, V_N$ (N is the number of sample faces), and said eigenvectors and said corresponding eigenvalues are given as $e_1, e_2, \ldots, e_M$, and $\lambda_1, \lambda_2, \ldots, \lambda_M$ (M<<m×n), respectively, and wherein said means for calculating the degree of similarity comprises means for calculating, as said degree of similarity, the Maharanobis distance $$\sqrt{\sum_{j=1}^{M} \frac{((x - \overline{V}, e_j) - (y - \overline{V}, e_j)^2)}{\lambda^j}}$$

where $$\overline{V} = \frac{1}{N} \cdot \sum_{i=1}^{N} V_i.$$

9. A system capable of pattern matching between a first face image having been obtained in a first imaging condition and a second face image having been obtained in a second imaging condition noisier than the first imaging condition, the system comprising:

data means stored in a storage for use in extracting principal components from a given face image, said data means having been obtained by:

for a plurality of sample faces, taking in respective first sample images in a first sample imaging condition similar to or the same as said first imaging condition;

taking in, for said plurality of said sample faces, respective second sample images in a second sample imaging condition similar to or the same as said second imaging condition;

calculating a weighted sum of a first covariance matrix calculated from said first sample images and a second covariance matrix calculated from differences between said first sample images and said second sample images; and applying a principal component analysis to said weighted sum to find a result with which principal components are calculated from a given face image;

first means for obtaining said first face image;

second means for obtaining said second face image;

means operative on the basis of a standard formula for calculating a degree of similarity between said first and second face images by using said data means; and means operative on the basis of a comparison of said degree of similarity with a predetermined threshold value for determining whether said first face image matches said second image, wherein said data means comprises eigenvectors and corresponding eigenvalues resulted from solving an eigenvalue problem with respect to said weighted sum, wherein said first and second images (of m×n pixels) are given as vectors x and y, said first face images are given as $V_1, V_2, V_N$ (N is the number of sample faces), and said eigenvectors and said corresponding eigenvalues are given as $e_1, e_2, \ldots, e_M$ and $\lambda_1, \lambda_2, \ldots, \lambda_M$ (M<<m×n), respectively, and wherein said means for calculating the degree of similarity comprises means for calculating, as said degree of similarity, the correlation between x and y $$\frac{\sum_{j=1}^{M}(x-\overline{V},e_j)(y-\overline{V},e_j)/\lambda_j}{\sqrt{\sum_{j=1}^{M}(x-\overline{V},e_j)^2/\lambda_j}\sqrt{\sum_{j=1}^{M}(y-\overline{V},e_j)^2/\lambda_j}}$$

where $$\overline{V} = \frac{1}{N} \cdot \sum_{i=1}^{N} V_i.$$

10. The system as defined in claim 8, further comprising means, activated prior to an operation of said means for calculating the degree of similarity, for adding a predetermined constant value σ to each of said eigenvalues $\lambda_1, \lambda_2, \ldots, \lambda_M$ stored in said storage.

11. The system as defined in claim 8, further comprising means, activated prior to an operation of said means for calculating the degree of similarity, for adding, to each of said eigenvalues $\lambda_1, \lambda_2, \ldots, \lambda_M$ stored in said storage, a value τ defined as follows:

$$\tau = \frac{1}{M}\sum_{j=1}^{M} \lambda_j((1-\mu_j)/\mu_j)$$

where $\mu_j=((B-A)(j-1))/(M-1)+A$, where A and B are fixed values specific to the system and satisfy A<B.

12. A system capable of pattern matching between a first face image having been obtained in a first imaging condition and a second face image having been obtained in a second imaging condition noisier than the first imaging condition, the system comprising:

data means stored in a storage for use in extracting principal components from a given face image, said data means having been obtained by:
  for a plurality of sample faces, taking in respective first sample images in a first sample imaging condition similar to or the same as said first imaging condition;
  taking in, for said plurality of said sample faces, respective second sample images in a second sample imaging condition similar to or the same as said second imaging condition;
  calculating a weighted sum of a first covariance matrix calculated from said first sample images and a second covariance matrix calculated from differences between said first sample images and said second sample images; and
  applying a principal component analysis to said weighted sum to find a result with which principal components are calculated from a given face image;
first means for obtaining said first face image;
second means for obtaining said second face image;
means operative on the basis of a standard formula for calculating a degree of similarity between said first and second face images by using said data means; and
means operative on the basis of a comparison of said degree of similarity with a predetermined threshold value for determining whether said first face image matches said second image, wherein said data means comprises a characterizing matrix H which, when applied to a first face image vector x, and a second face image vector y, yields principal component vectors x' and y' thereof, respectively, as follows:

x'=Hx; and
y'=Hy.

13. The system as defined in claim 12, wherein said means for calculating the degree of similarity comprises means for calculating, as said degree of similarity, a Euclidean distance ∥x'−y'∥.

14. The system as defined in claim 12, wherein said means for calculating the degree of similarity comprises means for calculating, as said degree of similarity, a cosine of the included angle by said vectors x' and y' as follows:

(x'*y')/(|x'|·|y'|), where |x'| and |y'| is the magnitude of the vectors x' and y', respectively, and (x'*y') is an inner product of the vectors x' and y'.

15. The system as defined in claim 9, further comprising means, activated prior to an operation of said means for calculating the degree of similarity, for adding a predetermined constant value σ to each of said eigenvalues $\lambda_1, \lambda_2, \ldots, \lambda_M$ stored in said storage.

16. The system as defined in claim 9, further comprising means, activated prior to an operation of said means for calculating the degree of similarity, for adding, to each of said eigenvalues $\lambda_1, \lambda_2, \ldots, \lambda_M$ stored in said storage, a value τ defined as follows:

$$\tau = \frac{1}{M}\sum_{j=1}^{M} \lambda_j((1-\mu_j)/\mu_j)$$

where $\mu_j=((B-A)/(j-1))/(M-1)+A$, where A and B are fixed values specific to the system and satisfy A<B.

17. A method of determining whether a first face image, having been obtained in a first imaging condition, matches a second face image, having been obtained in a second imaging condition noisier than the first imaging condition, the method comprising:

a preparation stage for preparing a data set for use in the determination; and a matching or test stage for carrying out the determination, said preparation stage comprising the steps of:

for a plurality of sample faces, obtaining respective first sample images in a first sample imaging condition similar to or the same as said first imaging condition;

for said plurality of said sample faces, obtaining respective second sample images in a second sample imaging condition similar to or the same as said second imaging condition;

calculating a weighted sum of a first covariance matrix calculated from said first sample images and a second covariance matrix calculated from differences between said first sample images and said second sample images;

applying a principal component analysis to said weighted sum to find a result with which principal components are calculated from a given face image; and storing said result as said data set in a storage, and said matching stage comprising the steps of:
  obtaining said first face image in said first imaging condition;
  obtaining said second face image in said second imaging condition;
  calculating a degree of similarity between said first and second face images on the basis of a standard formula by using said data set; and
  carrying out said determining on the basis of a comparison of said degree of similarity with a predetermined threshold value,
  wherein one of said step of obtaining said first face image and said step of obtaining said second face image comprises the step of obtaining and adding said face image to a set of reference face images prior to all other steps of said matching stage, and wherein said step of calculating a degree of similarity comprises the step of calculating a degree of similarity between a given face image and each face image of said set.

18. A method of determining whether a first face image, having been obtained in a first imaging condition, matches a second face image having been obtained in a second imaging condition noisier than the first imaging condition, the method comprising:
  a preparation stage for preparing a data set for use in the determination; and
  a matching or test stage for carrying out the determination, wherein said preparation stage comprises the steps of:
    for a plurality (N) of first sample faces, obtaining respective first sample images in a sample imaging condition similar to or the same as said first imaging condition;
    for said N sample faces, obtaining respective second sample images in a second sample imaging condition similar to or the same as said second imaging condition;
    for a plurality (L) of second sample faces, obtaining respective third sample images in said sample imaging condition;
    calculating a weighted sum of a first covariance matrix calculated from said third sample images and a second covariance matrix calculated from differences between said first sample images and said second sample images;
    applying a principal component analysis to said weighted sum to find a result with which principal components are calculated from a given face image; and
    storing said result as said data set in a storage, and
  said matching stage comprising the steps of:
    obtaining said first face image in said first imaging condition; and
    obtaining said second face image in said second imaging condition;
    calculating a degree of similarity between said first and second face images on the basis of a standard formula by using said data set; and
    carrying out said determining on the basis of a comparison of said degree of similarity with a predetermined threshold value,
    wherein one of said step of obtaining said first face image and said step of obtaining said second face image comprises the step of obtaining and adding said face image to a set of reference face images prior to all other steps of said matching stage, and wherein said step of calculating a degree of similarity comprises the step of calculating a degree of similarity between a given face image and each face image of said set.

19. A system capable of pattern matching between a first face image having been obtained in a first imaging condition and a second face image having been obtained in a second imaging condition noisier than the first imaging condition, the system comprising:
  data means stored in a storage for use in extracting principal components from a given face image, said data means having been obtained by:
    for a plurality of sample faces, taking in respective first sample images in a first sample imaging condition similar to or the same as said first imaging condition:
    taking in, for said plurality of said sample faces, respective second sample images in a second sample imaging condition similar to or the same as said second imaging condition;
    calculating a weighted sum of a first covariance matrix calculated from said first sample images and a second covariance matrix calculated from differences between said first sample images and said second sample images; and
    applying a principal component analysis to said weighted sum to find a result with which principal components are calculated from a given face image;
  first means for obtaining said first face image;
  second means for obtaining said second face image;
  means operative on the basis of a standard formula for calculating a degree of similarity between said first and second face images by using said data means; and
  means operative on the basis of a comparison of said degree of similarity with a predetermined threshold value for determining whether said first face image matches said second image,
  wherein one of said first means and said second means includes storage means that stores a reference face image set database, and wherein said means for calculating a degree of similarity comprises means for calculating a degree of similarity between a given face image and each face image of said reference face image set.

20. A system capable of pattern matching between a first face image obtained in a first imaging condition and a second face image obtained in a second imaging condition noisier than the first imaging condition, the system comprising:
  data means stored in a storage for use in extracting principal components from a given face image, said data means having been obtained by:
    for a plurality (N) of first sample faces, taking in respective first sample images in a sample imaging condition similar to or the same as said first imaging condition;
    taking in, for said N sample faces, respective second sample images in a second sample imaging condition similar to or the same as said second imaging condition;
    for a plurality (L) of second sample faces, taking in respective third sample images in said sample imaging condition;
    calculating a weighted sum of a first covariance matrix calculated from said third sample images and a second covariance matrix calculated from differences between said first sample images and said second sample images; and applying a principal component analysis to said weighted sum;

first means for obtaining said first face image;

second means for obtaining said second face image;

means operative on the basis of a standard formula for calculating a degree of similarity between said first and second face images by using said data means; and means operative on the basis of a comparison of said degree of similarity with a predetermined threshold value for determining whether said first face image matches said second image, wherein one of said first means and said second means includes storage means that stores a set of reference face images, and wherein said means for calculating a degree of similarity comprises means for calculating a degree of similarity between a given face image and each face image of said set.

* * * * *